United States Patent
Guo et al.

(10) Patent No.: US 8,918,372 B1
(45) Date of Patent: Dec. 23, 2014

(54) CONTENT-AWARE DISTRIBUTED DEDUPLICATING STORAGE SYSTEM BASED ON CONSISTENT HASHING

(71) Applicants: Feng Guo, Shanghai (CN); Qiyan Chen, Shanghai (CN); Mandavilli Navneeth Rao, Santa Clara, CA (US); Lintao Wan, Shanghai (CN); Dong Xiang, Shanghai (CN)

(72) Inventors: Feng Guo, Shanghai (CN); Qiyan Chen, Shanghai (CN); Mandavilli Navneeth Rao, Santa Clara, CA (US); Lintao Wan, Shanghai (CN); Dong Xiang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/622,543

(22) Filed: Sep. 19, 2012

(51) Int. Cl.
*G06F 17/30* (2006.01)

(52) U.S. Cl.
USPC .......................................... 707/692; 707/747

(58) Field of Classification Search
None
See application file for complete search history.

(56) References Cited

U.S. PATENT DOCUMENTS

| 8,266,115 | B1 | 9/2012 | Park et al. | |
|---|---|---|---|---|
| 2007/0282915 | A1* | 12/2007 | Vosshall et al. | 707/200 |
| 2009/0122724 | A1* | 5/2009 | Rosenberg | 370/255 |
| 2011/0055621 | A1* | 3/2011 | Mandagere et al. | 714/4 |
| 2011/0099351 | A1* | 4/2011 | Condict | 711/216 |
| 2011/0145207 | A1 | 6/2011 | Agrawal et al. | |
| 2011/0219205 | A1* | 9/2011 | Wright | 711/206 |
| 2011/0231362 | A1* | 9/2011 | Attarde et al. | 707/609 |
| 2012/0158672 | A1 | 6/2012 | Oltean et al. | |
| 2012/0166403 | A1 | 6/2012 | Kim et al. | |
| 2013/0041872 | A1* | 2/2013 | Aizman et al. | 707/690 |

OTHER PUBLICATIONS

Osuna et al., "Implementing IBM Storage Data Deduplication Solutions", Mar. 2011, pp. 32-35, 58-59, 104, 259-264.

* cited by examiner

*Primary Examiner* — Tony Mahmoudi
*Assistant Examiner* — Umar Mian
(74) *Attorney, Agent, or Firm* — Van Pelt, Yi & James LLP

(57) ABSTRACT

A set of metadata associated with backup data is obtained. A consistent hash key for the backup data is generated based at least in part on the set of metadata. The backup data is assigned to one of a plurality of deduplication nodes based at least in part on the consistent hash key.

25 Claims, 12 Drawing Sheets

| Metadata Field | Metadata Value |
|---|---|
| File Type | Microsoft Word, PDF, HTML, JPEG |
| OS | Microsoft Windows, LINUX, Apple MacOS |
| Source Org. | Legal Dept., Engineering Dept., Finance Dept. |
| Encryption | Yes, No |
| Permissions | Read Only, Writeable |
| Backup Level | Full Backup, Incremental Backup, Differential Backup |
| Backup Timestamp | Backup Time, Backup Day |
| Backup Retention Policy | Keep Forever, Delete When Space Needed, Keep At Least 1 Year |
| Backup Data Type | File Based Backup, Block Based Backup |

306 — 304 — 300 (top group); 302 (backup group)

FIG. 3

CONTENT-AWARE DISTRIBUTED DEDUPLICATING STORAGE SYSTEM BASED ON CONSISTENT HASHING

BACKGROUND OF THE INVENTION

Deduplication storage systems, such as EMC Data Domain storage systems, perform deduplication to minimize the amount of storage consumed. Instead of storing two copies of the same piece of data, a single copy is stored (e.g., with two links or identifiers referencing the single copy). Companies are storing and managing ever growing amounts of data (sometimes referred to as "big data") which may require thousands or tens of thousands of deduplication nodes in a distributed deduplication storage system. Typically, the number of deduplication nodes in a distributed deduplication storage system fluctuates over time. For example, the number of deduplication nodes may decrease (e.g., because one or more deduplication nodes fail) or increase (e.g., because new deduplication node(s) is/are brought online). When this happens, some deduplication storage systems redistribute a significant amount of data in the system which consumes resources (e.g., I/O resources between deduplication nodes) and impedes other requests or services (e.g., a service request from a user). It would be desirable if distributed deduplication storage systems were better able to handle fluctuating numbers of deduplication nodes.

BRIEF DESCRIPTION OF THE DRAWINGS

Various embodiments of the invention are disclosed in the following detailed description and the accompanying drawings.

FIG. 3 is a diagram showing an embodiment of metadata associated with backup data.

DETAILED DESCRIPTION

Figure 1:
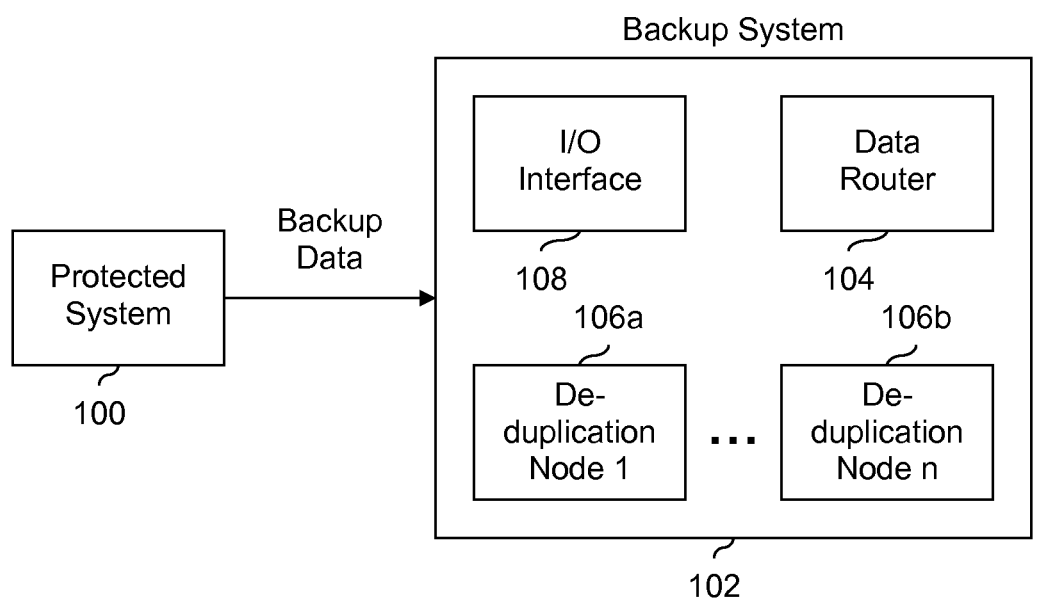
FIG. 1 is a diagram showing an embodiment of a backup system which uses consistent hashing to assign backup data to one of a plurality of deduplication nodes.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to assign backup data to one of a plurality of deduplication nodes is described herein. In some embodiments, the deduplication nodes are part of a deduplication storage system and/or a backup system. A set of metadata associated with the backup data is obtained and a consistent hash key is generated for the backup data based at least in part on the set of metadata. In some embodiments, metadata used to generate a consistent hash key includes not just what is conventionally considered metadata (e.g., time of creation, owner, and so on) but the data itself and/or any characteristics derived or extracted from the data. In some embodiments, there are hundreds or thousands of pieces or types of metadata available, but only a handful (e.g., three or fewer) types or kinds of metadata are used to generate a consistent hash key. In some embodiments, the metadata to use in generating a consistent hash key is specified via a list and/or is determined during a design phase of a storage system. In some embodiments, metadata used to generate a consistent hash key is dynamically chosen at run-time, algorithmically, and/or is based on an on-going analysis of the environment and system in which the deduplication is being run. Backup data is assigned to one of a plurality of deduplication nodes based at least in part on the consistent hash key.

FIG. 1 is a diagram showing an embodiment of a backup system which uses consistent hashing to assign backup data to one of a plurality of deduplication nodes. In the example shown, protected system 100 is protected (e.g., from device failure, corruption, and/or accidental deletion) using backup system 102. In various embodiments, protected system 100 is a desktop (e.g., single user) device, an application server (e.g., accessed by many users), a web server, a file server, etc.

Backup data is sent from protected system 100 to backup system 102 where it is processed and stored. In various embodiments, the backup data exchanged between protected system 100 and backup system 102 is associated with a full, incremental, or differential backup; a file-based or a block-based backup; etc. In the event some data on protected system 100 is no longer accessible (e.g., because of accidental deletion or device failure), the backup data stored on backup system 102 is retrieved and restored on protected system 100 and/or redirected to any other target system.

In this example, backup system 102 is a deduplication backup system, such as EMC Data Domain, which uses deduplication to minimize the amount of (e.g., backup) storage consumed. For example, if data router 104 sends a piece of backup data to deduplication node 106a and then some time later sends an identical copy to deduplication node 106a, only a single copy is physically or actually stored. (In one example of how this may occur, two full backups may occur and a given file may be unchanged between the two full backups.) Input/output (I/O) interface 108 may record two identifiers, links, or references so that backup system 102 knows that it was given identical backup data at two different times and is able to return the backup data to protected system 100 if so requested. For example, I/O interface 108 may keep one or more local references: local path→(deduplication node 106a)::(remote path). In the event the data is requested, I/O interface 108 follows the local file reference to fetch the data from the appropriate deduplication node (in this example, deduplication node 106a).

In another example, data router 104 forwards two pieces of similar backup data to deduplication node 106a. For example, the backup data may be identical except for some additional content in one but not the other, or the content may be the same but some piece of metadata has changed (e.g., the file permissions have changed from read-only to writeable). In some embodiments, a deduplication node in such situations detects the similarity between the two, stores a single copy of a matching portion (e.g., matching metadata and/or matching content), and stores the additional or different content and/or metadata, remembering how to reconstruct the original backup data from what was saved. In some embodiments, a deduplication node is able to perform deduplication on identical or similar backup data even if other data is received between the two identical or similar pieces of backup data.

Although this example shows data router 104 and deduplication nodes 106a and 106b in a backup system, the technique described herein may be used in a variety of applications or systems. For example, a primary system (e.g., protected system 100) may use the technique described herein to efficiently store data on itself. This may be useful for devices with limited storage (e.g., small and/or mobile devices, such as mobile telephones). In some embodiments, system 102 is an archiving system. In some embodiments there is a "data router" sitting above a cluster of multi-node deduplication systems, directing backup data to the correct system based on consistent hashing. Further routing to a specific node within the system may be done by another internal data router. These are some exemplary applications of the technique and are not intended to be limiting.

In some embodiments, protected system 100 is a distributed protected system (i.e., having a plurality of protected nodes). In some embodiments, I/O interface 108 and/or data router 104 performs some additional management to accommodate a distributed protected system. For example, the namespace may only be unique for each node in the protected system and there may be no guarantee of unique names or paths across the entire distributed protected system (e.g., it may be possible for a file called ".permissions" to exist at /user/home/ on two different LINUX devices). In some embodiments, I/O interface 108 records or annotates each piece of backup data received with the protected node from which it was received. In this way, names or paths across the entire distributed protected system are made unique. In some other embodiments, a global file namespace may be maintained in some other manner.

Figure 2:
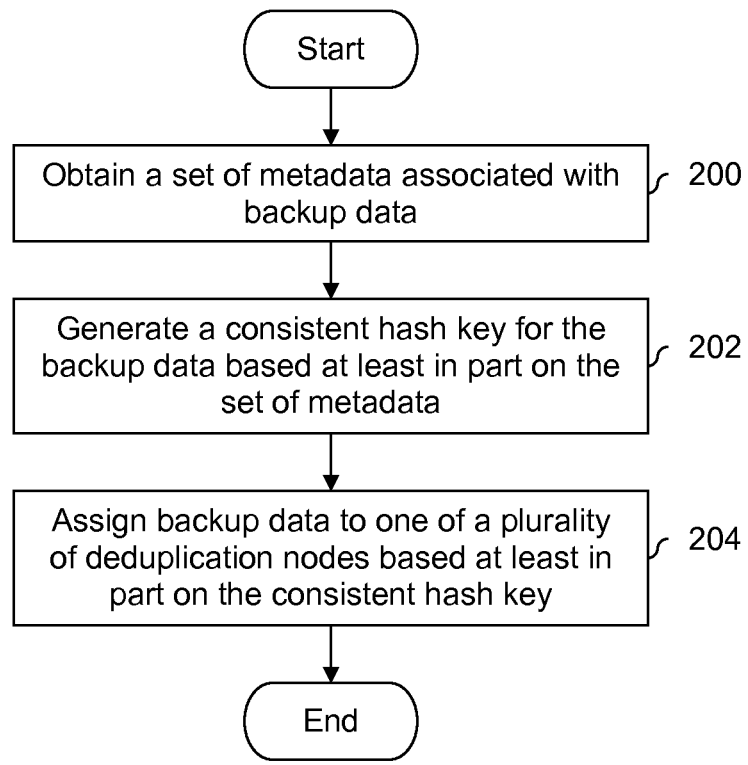
FIG. 2 is a flowchart illustrating an embodiment of a process for assigning backup data to one of a plurality of deduplication nodes using consistent hashing.

FIG. 2 is a flowchart illustrating an embodiment of a process for assigning backup data to one of a plurality of deduplication nodes using consistent hashing. In some embodiments, the process is performed by data router 104 in FIG. 1 when deciding which deduplication node to assign backup data to.

At 200, a set of metadata associated with backup data is obtained. In some embodiments, there are hundreds or thousands of possible pieces of metadata, of which a few are obtained at 200. In various embodiments, obtaining at 200 includes algorithmically selecting metadata based on policy requirements, heuristic analysis and/or environmental conditions extant at the time of backup. The following figure shows some example metadata.

FIG. 3 is a diagram showing an embodiment of metadata associated with backup data. For brevity, in this example, each piece of backup data (not shown) has 9 pieces of metadata associated with it. In FIG. 3, metadata 300 relates to an intrinsic characteristic of the source data which would still be present and/or meaningful even if no backup were performed. Metadata 300 includes file type or extension (e.g., Microsoft Word (.doc), Portable Document Format (PDF), HyperText Markup Language (HTML), Joint Photographic Experts Group (JPEG), etc.), an operating system associated with the backup data (e.g., Microsoft Windows, LINUX, Apple MacOS, etc.), a source organization (e.g., whether the backup data originated from the Legal Department, Engineering Department, or Finance Department of a company), encryption (e.g., whether the backup data includes encrypted data or not), and permissions (e.g., whether the data is read only or writeable).

Metadata 302 relates to the backup and includes backup level (e.g., a full backup versus an incremental or differential backup), a time and/or date at which a backup occurred, a retention policy or setting associated with the backup (e.g., the backup is permitted to be deleted when space is needed, the backup should be kept at least one year, the backup should be kept indefinitely, etc.), and a backup data type (e.g., file based backup versus block based backup).

In this example, of the 9 total pieces of metadata, only 2 are used to generate a consistent hash key. Specifically, operating system 304 and file type 306 are used. In some other embodiments, one or more of the following pieces of metadata are used: IP address; domain name; hostname; OS version; application; application version; file name; file type; file owner; creation time; modification time; language; format; whether data is text, numeric, alpha-numeric, or graphic; executive/VIP content; backup application; backup protocol; backup format; and/or derived keys from the actual data content.

Returning to FIG. 2, at 202, a consistent hash key is generated for the backup data based at least in part on the set of metadata. In one example of step 202, if the set obtained at 202 includes operating system and file type, then for a piece of backup data where the metadata values are Microsoft Windows and Microsoft Word, those values are input to a consistent hash and a hash key is generated. The technique described herein is not limited to any particular consistent hash technique or implementation; any appropriate or desired consistent hash technique or implementation may be used. In some embodiments, generating a consistent hash key at 202 includes obtaining weights for each metadata in the set and using the weights to generate the consistent hash key. In various embodiments, weights may be specified or otherwise set ahead of time (e.g., when a storage system is being designed), determined upon installation of the backup system (e.g., so that a company in one business may have different weights compared to another customer in another business, depending upon their backup data and its corresponding metadata), generated on the fly, and/or based on a heuristic analysis (e.g., of the operating policies, the data, and/or the environment).

Some pieces of metadata may tend to be more useful in generating a consistent hash key at 202 which optimizes deduplication performance compared to other pieces of metadata. As such, in some embodiments, the process shown in FIG. 2 does not use all available metadata in generating a consistent hash at 202. In some embodiments, the set of metadata used at 202 is determined ahead of time (e.g., during the design phase of a backup system) and a predetermined list of metadata to use in generating a consistent hash is obtained as part of step 200 in FIG. 2.

In some embodiments, generating a consistent hash key at 202 includes using the backup data itself (e.g., the content of the data being backed up). For example, if backup data is associated with a file, then in some embodiments a consistent hash key is based at least in part on the contents of the file. The (backup) data itself may be a good indicator of the uniqueness (or, conversely, the deduplicability) of the (backup) data. For example, it may be desirable to send backup data with the same or similar content to the same deduplication node in order to optimize deduplication performance.

Figure 4:
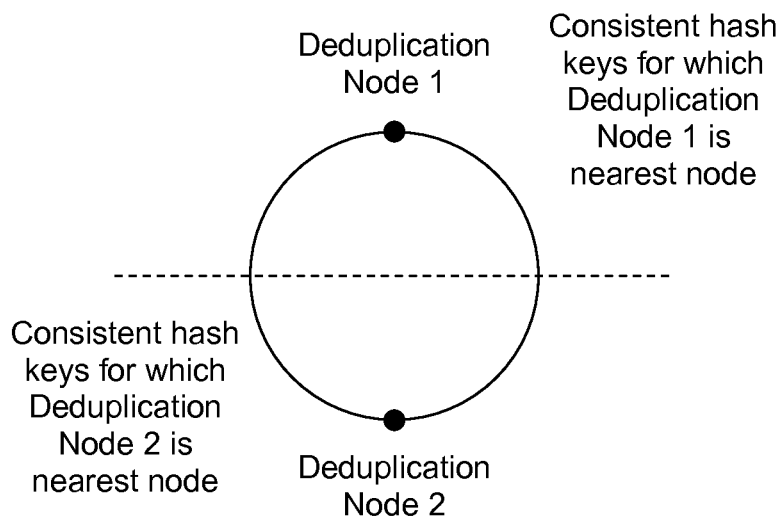
FIG. 4 is a diagram showing an embodiment of backup data assigned to one of two deduplication nodes based at least in part on a consistent hash key.

The backup data is assigned to one of a plurality of deduplication nodes based at least in part on the consistent hash key at 204. FIG. 4 is a diagram showing an embodiment of backup data assigned to one of two deduplication nodes based at least in part on a consistent hash key. Although the example in FIG. 4 shows only two deduplication nodes, the technique may be extended to any number of deduplication nodes. In the example shown, possible consistent hash keys are angularly represented on a circle (e.g., hash keys are circular in nature, similar to phase). Deduplication node 1 and deduplication node 2 are assigned hash key values that are 180° apart. In this example they are disposed at 90° and 270° on the circle, but any positions or values may be assigned. The deduplication node which is the nearest neighbor to a particular hash key is the deduplication node to which corresponding backup data is assigned. As such, backup data having consistent hash keys in the top hemisphere are assigned to deduplication node 1 and backup data having consistent hash keys in the bottom hemisphere are assigned to deduplication node 2.

Using a consistent hash key to assign backup data to a deduplication node may be attractive in systems where the number of deduplication nodes fluctuates. One advantage of using a consistent hash key is efficient and/or minimal redistribution of content when the number of deduplication nodes in the system changes. For example, deduplication nodes may fail, causing the number of deduplication nodes to decrease. Conversely, new deduplication nodes may be added to a system (e.g., by system administrators in order to increase the storage capacity of a distributed deduplication storage system). Using consistent hashing in assigning backup data to a deduplication node may have better performance when the number of deduplication nodes changes compared to using some other hashing techniques. In some cases, some other hash techniques may regenerate new hash keys for all backup data, whereas a consistent hash may update fewer hash keys.

In some cases, the amount of backup data reassigned from one deduplication node to another may be greater using some other hash techniques compared to a consistent hash. It may be desirable to minimize the amount of reassigned backup data because reassignment may include sending the backup data from the old deduplication node to the new deduplication node, causing bandwidth resources (and possibly other resources) to be consumed.

In some embodiments, using metadata to generate a consistent hash key is attractive because it is readily accessible in a backup system. For example, as part of a backup process, a backup system may digest, parse, and/or identify metadata associated with the backup data (e.g., because should recovery be requested, metadata is integral to restoring the data in a useable form identical to what was originally on the protected system at the time of the backup). As such, metadata may be readily available within a backup system.

Returning to FIG. 2, the example process shown in FIG. 2 may be repeated as desired. For example, in FIG. 1, the process may be repeated for each piece of backup data that is received at data router 104 from protected system 100. In some embodiments, backup data is received from a protected system in segments and/or out-of-order.

In some embodiments, the example process shown in FIG. 2 is performed in the event one of the deduplication nodes fails or a new deduplication node is added. For example, if a deduplication node fails, the process may be performed on the backup data assigned to the failing deduplication node so that all of the backup data is associated with a functioning deduplication node. As such, assignment at 204 is typically limited to functioning deduplication nodes. In some embodiments, the hash-generating algorithm is adjusted; a hash may be intrinsically dependent on the number of nodes to which an assignment is made. Similarly, if a new deduplication node is added, the example process shown in FIG. 2 may be performed, for example by either or both of the two nearest neighbors of the new deduplication node.

As described above, using a consistent hash key to assign backup data to a deduplication node may be useful and/or advantageous when the number of deduplication nodes in a system changes. The following figures continue the example of FIG. 4. First, an example where the number of deduplication nodes increases is described. Then, an example where the number of deduplication nodes decreases is described.

Figure 5:
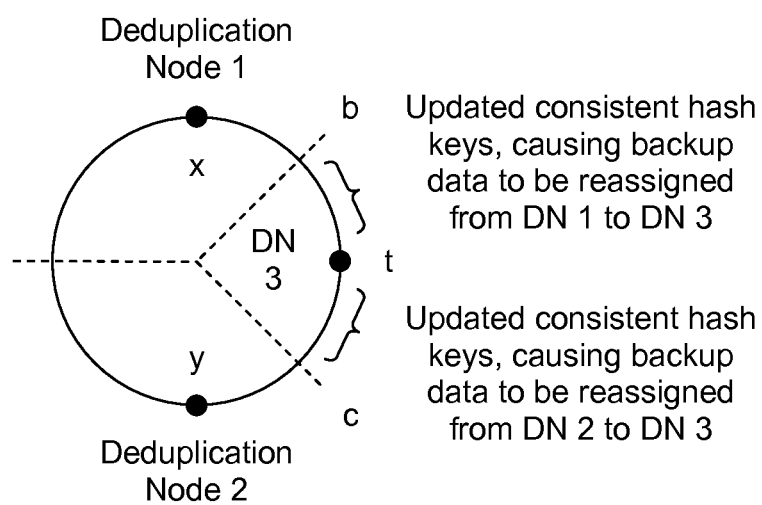
FIG. 5 is a diagram showing an embodiment of angularly-represented consistent hash keys with a new deduplication node added to a distributed deduplication storage system.

FIG. 5 is a diagram showing an embodiment of angularly-represented consistent hash keys with a new deduplication node added to a distributed deduplication storage system. In the example shown, a third deduplication node has been added to the distributed deduplication storage system of FIG. 4. Deduplication node 3 has a hash key value of t which in this particular example is also the midpoint between x (the hash key value of deduplication node 1) and y (the hash key value of deduplication node 2). Dashed lines show which deduplication node a piece of backup data is assigned to based on the (in some cases, updated) consistent hash keys with the inclusion of newly added deduplication node 3.

Hash key values between b (i.e., the midpoint of x, the hash key value of deduplication node 1, and t, the hash key value of deduplication node 3) and t are mapped to new hash key values. This update of those hash key values causes the backup data associated with those hash key values to be reassigned from deduplication node 1 to deduplication node 3. In some embodiments, reassigning backup data includes sending the reassigned backup data from deduplication node 1 to deduplication node 3.

Hash key values between c (i.e., the midpoint of y, the hash key value of deduplication node 2, and t, the hash key value of deduplication node 3) and t are also updated which causes the backup data associated with those hash key values to be reassigned from deduplication node 2 to deduplication node 3. As described above, reassigning backup data to another deduplication node may include sending the affected backup data to that other deduplication node.

The other hash key values (i.e., the three-quarters of the circle from b to c) remain the same and backup data associated with those hash key values are not necessarily updated and/or related backup data is not necessarily re-assigned to another deduplication node.

As shown in this example, a benefit to using a consistent hash key to assign backup data to deduplication nodes is that when the number of deduplication nodes changes (in this case, the number increased), a relatively small amount of the hash key values are updated or otherwise remapped. In this case, for example, only one-quarter of the hash key values are reassigned and the other three-quarters of the hash key values remain with their current deduplication nodes. On average, only K/n hash keys will be remapped where K is the number of hash keys and n is the number of deduplication nodes in the system. The exact number of updated hash keys may depend upon the hash key values of the two adjacent deduplication nodes and the hash key value of the new deduplication node. With some other techniques, nearly all of the hash key values would be updated, which causes the amount of backup data reassigned to a new deduplication node to increase as well. Minimizing the number of hash keys which are updated and/or the amount of backup data reassigned to a new deduplication node when the number of deduplication nodes changes is attractive because then resources are not taken away from other tasks (e.g., ensuring that new backup data is properly ingested and assigned to a deduplication node and/or responding to a user request to access and restore backup data).

In some embodiments, t is not the midpoint between x and y, but the same basic idea applies (i.e., at least some hash keys are updated and at least some backup data is reassigned to the new deduplication node based on the consistent hash key values of the backup data). Although this example shows a single deduplication node being added, in some cases multiple deduplication nodes are brought online at substantially the same time; the techniques described herein are still applicable.

A variety of techniques may be used to detect when the number of deduplication nodes in a distributed deduplication storage system changes (e.g., in FIGS. 4 and 5, the number of deduplication nodes increases from two to three). The following figures show some example node discovery processes which may be used to detect when the number of deduplication nodes changes.

Figure 6:
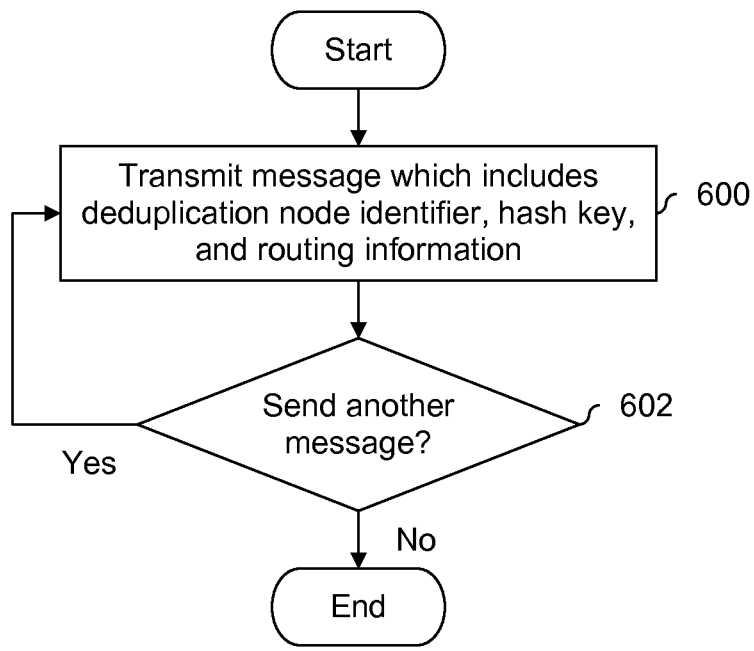
FIG. 6 is a flowchart illustrating an embodiment of a node discovery process associated with advertising a node.

FIG. 6 is a flowchart illustrating an embodiment of a node discovery process associated with advertising a node. Conceptually, the process shown in FIG. 6 may be thought of as a transmitter-side node discovery process. In some embodiments, the example process is performed by each deduplication node in a system (e.g., each of nodes 106a-106b in FIG. 1). At 600, a message is transmitted which includes a deduplication node identifier, a hash key, and routing information. For example, if the process is performed by deduplication node 106a, then the deduplication node identifier may be "DN 1" and the hash key value may be "x." Routing information may be any information used by another node in the event backup data is reassigned from that other node to the node which transmitted the message at 600 (e.g., to continue the previous example, deduplication node 1). Some examples of routing information include a network address or a (e.g., outbound) port or path. In some embodiments, transmitting a message at 600 includes broadcasting the message to all nodes in a system (e.g., setting the destination address to "broadcast" or "all" and/or sending the message out on all outbound ports or paths).

In some embodiments, a message transmitted at 600 includes a timestamp. In some applications this is attractive because other nodes that receive the message know when the message was transmitted by the sending deduplication node. This enables all nodes in a system to agree upon when to discard information, for example even if a nearby node receives the message quickly and a distant node receives the same message much later.

At 602, it is determined whether to send another message. For example, messages may be transmitted periodically and when a timer expires the next message is transmitted at 600. In some embodiments, the example process runs (e.g., periodically) so long as a deduplication node is running.

Figure 7:
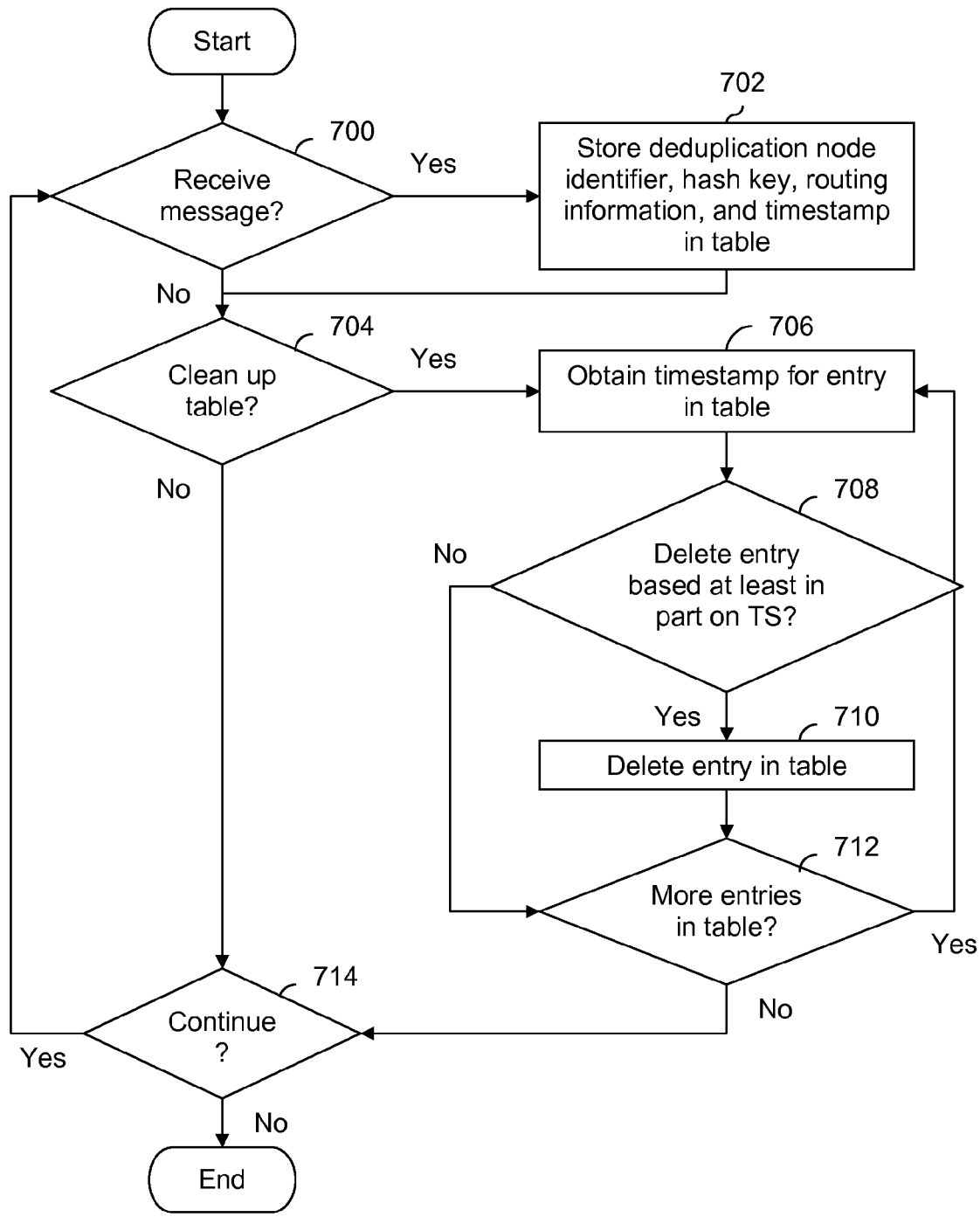
FIG. 7 is a flowchart illustrating an embodiment of node discovery processes associated with recording advertised deduplication nodes and cleaning up a table.

FIG. 7 is a flowchart illustrating an embodiment of node discovery processes associated with recording advertised deduplication nodes and cleaning up a table. Conceptually, the process shown in FIG. 7 may be thought of as a receiver-side node discovery process corresponding to the exemplary transmitter-side process shown in FIG. 6. In some embodiments, the example process is performed by each deduplication node in a system (e.g., each of nodes 106a-106b in FIG. 1).

At 700, it is determined whether a message is received. If so, a deduplication node identifier, hash key, routing information, and timestamp are stored in a table at 702. In some cases, there is already an entry in the table from that deduplication node (e.g., containing information from a previously received message). In some embodiments, an older entry in a table is overwritten with newer information. In some other embodiments, both entries (e.g., one for the older message and one for the newer message) are stored in a table. In some embodiments, the timestamp stored at 702 is included in the message received. In some embodiments, a transmitting deduplication node includes in the message a timestamp when the message was sent. This may enable receiving nodes to know how old the message is, regardless of how long or short the propagation delay is and/or how few or many hops the message took. In some other embodiments, a stored timestamp is a time at which the message is received (e.g., by that particular receiving node).

After storing at 702 or if no message is received at 700, it is decided at 704 whether to clean up a table. For example, table clean up may occur on a periodic basis (e.g., once a day, every hour, every few minutes, etc.). If so, at 706, a timestamp for an entry in a table is obtained. For example, each entry may include (at least) a deduplication node identifier, a hash key, routing information, and a timestamp and the portion of the entry that contains the timestamp is accessed in memory. At 708, it is determined whether to delete an entry based at least in part on the timestamp. For example, anything with a timestamp of more than one hour ago may be determined to be too old. A cutoff or threshold used at 708 may be configurable or adjustable (e.g., so that the system can be adjusted to delete entries that are older than an adjustable amount of time). If it is so decided at 708, the entry in the table is deleted at 710. To continue the example above, if an exemplary timestamp is 2 hours old and the threshold is "anything older than one hour ago" then the associated entry would be deleted. After deleting at 710 or if it was decided not to delete at 708, it is decided at 712 whether there are more entries in a table. If is yes, a timestamp for a next entry is obtained at 706.

If there are no more entries at 712 or if it is decided not to clean up a table at 704, it is decided at 714 whether to continue the process. If so, it is determined at 700 whether a message is received. In some embodiments, the example process runs (e.g., periodically) as long as a deduplication node is running.

Using the example process shown, information stored in a table will be kept up to date with information from nodes which have transmitted recently. In some embodiments, a threshold at 708 and/or a frequency of transmission associated with FIG. 6 may be adjusted or otherwise tuned as desired. In the event a deduplication node goes down, information in the table corresponding to the down deduplication node will eventually be removed from the table by the process shown in FIG. 7 and no new information will replace it. Conversely, a new deduplication node will advertise information about itself (one embodiment of which is shown in FIG. 6) and other deduplication nodes become aware of the new node when information is received from the new deduplication node and that information is added to the table.

FIGS. 6 and 7 show some embodiments of a peer-to-peer network discovery process. In some other embodiments, some other process is used (e.g., uPnP which enables nodes in a network to seamlessly discover each other's presence in a standard or defined manner) in addition to or as an alternative to the exemplary discovery process described herein.

Returning back to the example of FIG. 5, the hash key value (i.e., t) for the new deduplication node (in that example, deduplication node 3) was stated without explaining how the value of t was selected. The following process is one example of determining a hash key value for a new deduplication node which is to be added to a system.

Figure 8:
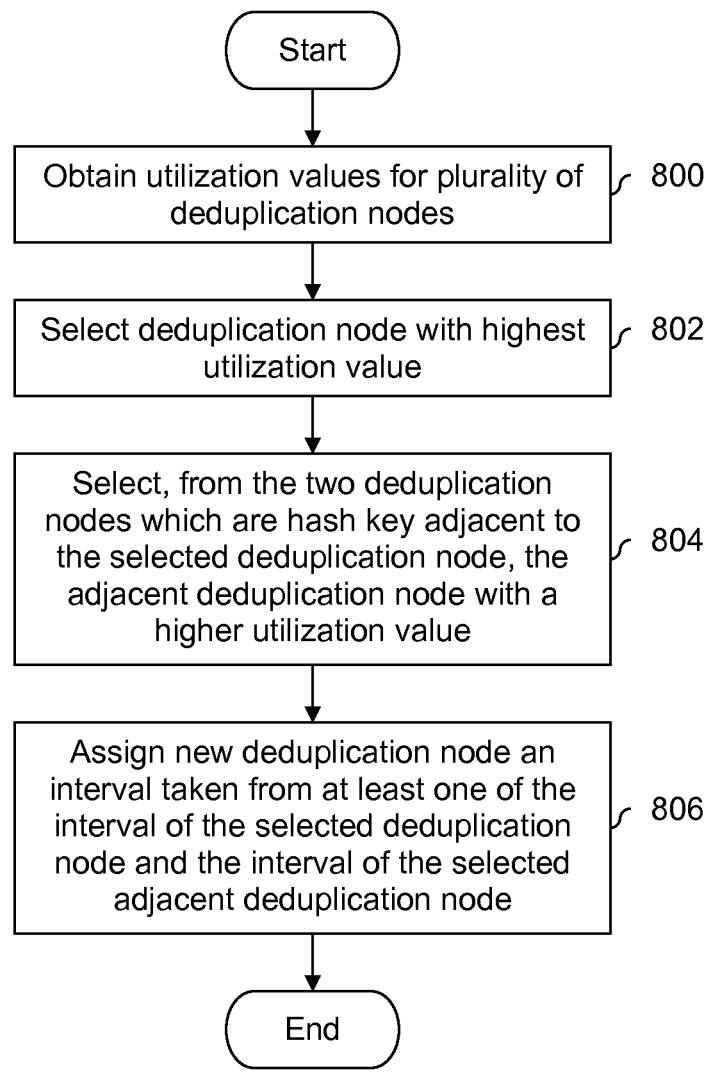
FIG. 8 is a flowchart illustrating an embodiment of a process for determining a hash key for a new deduplication node.

FIG. 8 is a flowchart illustrating an embodiment of a process for determining a hash key for a new deduplication node. In various embodiments, the process is performed by the new deduplication node (e.g., deduplication node 3 in FIG. 5) or some other device in the system (e.g., data router 104 in FIG. 1).

At 800, utilization values for a plurality of deduplication nodes are obtained. For example, suppose that there are 4 deduplication nodes having utilization values of 20%, 40%, 60%, and 80% utilization of available resources (e.g., utilization of storage). In some other embodiments, some other type of utilization value (e.g., processing resources, I/O resources, etc.) is obtained at 800.

A deduplication node with the highest utilization value is selected at 802. To continue the example above, the fourth deduplication node having a utilization of 80% would be selected.

At 804, the adjacent deduplication node with a higher utilization value is selected from the two deduplication nodes which are hash key adjacent to the selected deduplication node. By hash key adjacent, it is meant that two nodes have intervals (e.g., ranges of hash values) which are adjacent to each other (e.g., on a circle when angularly represented). Suppose, for example, that the four example deduplication nodes have intervals of −45° through 45° (the 20% utilization deduplication node), 45° through 135° (the 40% utilization deduplication node), 135° through 225° (the 60% utilization deduplication node), and 225° through 315° (the 80% utilization deduplication node). The two deduplication nodes which have intervals adjacent to the selected deduplication node (i.e., the 80% utilization node with an interval of 225° through 315°) are the nodes with intervals 135° through 225° (the node with a 60% utilization) and at −45° through 45° (with a 20% utilization). Of those two, 60% utilization>20% utilization, so the node with an interval of 135° through 225° is selected.

At 806, the new deduplication node is assigned an interval (e.g., of hash values) taken from at least one of the interval of the selected deduplication node and the interval of the selected adjacent deduplication node. The following tables show some examples of intervals assigned at 806 which continue the example described above.

TABLE 1

Example of interval assigned to new deduplication node taken evenly from hash key adjacent deduplication nodes

| | Deduplication Node with 60% utilization | New Deduplication Node | Deduplication Node with 80% utilization |
|---|---|---|---|
| Interval Before | 135° through 225° | N/A | 225° through 315° |
| Interval After | $135° \text{ through } \left(135° + \left(\frac{315° - 135°}{3}\right)\right) =$ 135° through 195° | $\left(135° + \left(\frac{315° - 135°}{3}\right)\right)$ through $\left(135° + 2\times\left(\frac{315° - 135°}{3}\right)\right) =$ 195° through 255° | $\left(135° + 2\times\left(\frac{315° - 135°}{3}\right)\right)$ through $\left(135° + 3\times\left(\frac{315° - 135°}{3}\right)\right) =$ 255° through 315° |

TABLE 2

Example of interval assigned to new deduplication node taken entirely from one hash key adjacent deduplication node

| | Deduplication Node with 60% utilization | New Deduplication Node | Deduplication Node with 80% utilization |
|---|---|---|---|
| Interval Before | 135° through 225° | N/A | 225° through 315° |

TABLE 2-continued

Example of interval assigned to new deduplication node taken entirely from one hash key adjacent deduplication node

| | Deduplication Node with 60% utilization | New Deduplication Node | Deduplication Node with 80% utilization |
|---|---|---|---|
| Interval After | 135° through 225° | 225° through $\left(225° + \left(\frac{315° - 225°}{2}\right)\right) =$ 225° through 270° | $\left(225° + \left(\frac{315° - 225°}{2}\right)\right)$ through $\left(225° + 2 \times \left(\frac{315° - 225°}{2}\right)\right) =$ 270° through 315° |

TABLE 3

Example of interval assigned to new deduplication node which uses a weighted average

| | Deduplication Node with 60% utilization | New Deduplication Node | Deduplication Node with 80% utilization |
|---|---|---|---|
| Interval Before | 135° through 225° | N/A | 225° through 315° |
| Interval After | 135° through $\left(225° - \left(\frac{60\%}{60\% + 80\%}\right) \times \left(\frac{315° - 135°}{3}\right)\right) =$ 135° through 199° | $\left(225° - \left(\frac{60\%}{60\% + 80\%}\right) \times \left(\frac{315° - 135°}{3}\right)\right)$ through $=$ $\left(225° + \left(\frac{80\%}{60\% + 80\%}\right) \times \left(\frac{315° - 135°}{3}\right)\right) = 199°$ through $259°$ | $\left(225° + \left(\frac{80\%}{60\% + 80\%}\right) \times \left(\frac{315° - 135°}{3}\right)\right)$ through $315° =$ 259° through 315° |

As shown in Table 1, in some embodiments, a new interval assigned at 806 takes equally from the two older intervals. Table 2 shows an example where an interval assigned to a new deduplication node is taken entirely from one hash key adjacent deduplication node. In some embodiments, a new interval takes more of its interval from the hash key of the deduplication node with the higher/highest utilization (e.g., to increase relief to the deduplication node with the higher/highest utilization). See, for example, Table 3.

As described above, deduplication nodes will sometimes fail (e.g., the example processes shown in FIGS. 6 and 7 may be used to detect when a deduplication node goes down). The following figure shows one embodiment in which hash keys are updated and correspondingly what backup data is reassigned to a new deduplication node in the event this occurs.

Figure 9:
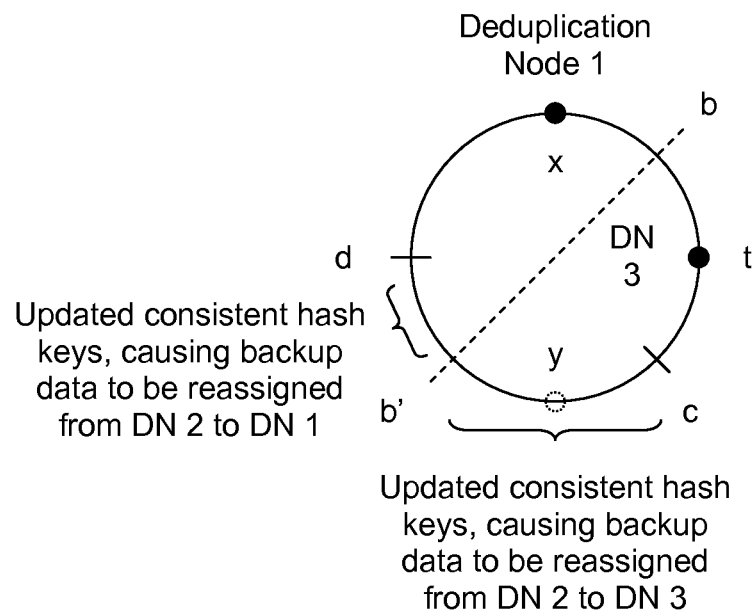
FIG. 9 is a diagram showing an embodiment of intervals of consistent hash keys after one of a plurality of deduplication nodes fails.

FIG. 9 is a diagram showing an embodiment of intervals of consistent hash keys after one of a plurality of deduplication nodes fails. In the example shown, deduplication node 2 (shown with a dotted circle at y=270°) from FIG. 5 has failed. As such, only deduplication node 1 (at x=90°) and deduplication node 3 (at t=0°) are functional and all backup data is assigned to one of those two nodes.

The dashed line shows the boundaries between intervals of hash key values and thus also shows the division of backup data between deduplication nodes 1 and 3. Backup data having consistent hash key values between b and b' in the upper left half of the circle are assigned to deduplication node 1 and backup data having consistent hash key values between b and b' in the lower right half of the circle are assigned to deduplication node 3. In this example, b'=b+180°. Consistent hash key values between d and b' are updated, causing that group of backup data to be reassigned from deduplication node 2 to deduplication node 1. Consistent hash key values between b' and c are updated, causing that group of backup data to be reassigned from deduplication node 2 to deduplication node 3.

When a deduplication node fails, the backup data assigned to it may be inaccessible. This is undesirable because a user may request that the protected system be restored to some previous state which may require access to the backup data on the down deduplication node. In some embodiments, reassigning backup data when a deduplication node goes down includes obtaining (e.g., from a protected system) a copy of the now-inaccessible backup data associated with the down deduplication node. (Alternatively, in some other embodiments data is reconstructed using erasure codes, parity bits or other algorithmic means of reconstruction; data is reconstructed using replication on the deduplication nodes themselves; and/or data is reconstructed by directly accessing the storage subsystems of the failed deduplication node.) The following flowchart shows one embodiment where backup data associated with a down deduplication node is obtained from a protected system.

Figure 10:
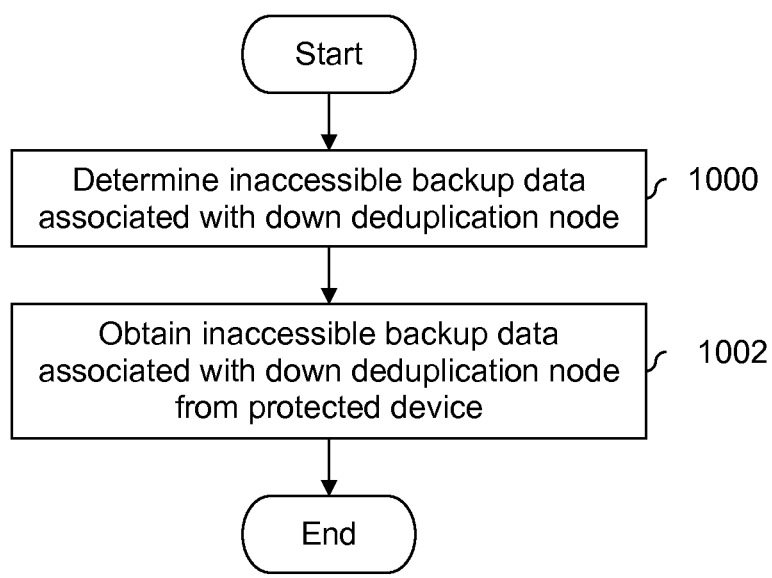
FIG. 10 is a flowchart illustrating an embodiment of a process for obtaining inaccessible backup data associated with a down deduplication node.

FIG. 10 is a flowchart illustrating an embodiment of a process for obtaining inaccessible backup data associated with a down deduplication node. Referring back to the example of FIG. 1, one or more components in backup system 102 may perform the example steps shown.

At 1000, inaccessible backup data associated with a down deduplication node is determined. In some embodiments, this is performed by data router 104 in FIG. 1. In some embodiments, a log is maintained (e.g., by data router 104 in FIG. 1) which records which backup data is assigned to which deduplication node and this log is used in the determination at 1000. In some embodiments, the determination at 1000 includes querying operational deduplication nodes about the backup data which they have and determining (e.g., by a process of elimination) what backup data a down deduplication node had.

The inaccessible backup data associated with a down deduplication node is obtained from a protected device at 1002. In FIG. 1, for example, I/O interface 108 may be used to obtain a copy of the backup data from protected system 100. In some embodiments, a backup agent (not shown in FIG. 1) running on protected system 100 provides the requested backup data in response to a request from I/O interface 108.

In some cases where the inaccessible backup data is not available from the protected device (e.g., because it is deleted from the protected device) data is retrieved by associating a backup node to each deduplication node. In various embodiments, a backup node is a totally different type of node or it may be a deduplication node that performs two roles: one as the deduplication node, and the other as the backup node of another deduplication node in the system. In the event a deduplication node goes down, its data can be obtained from its backup node. Although this taxes both processing and storage resources of all (primary) deduplication nodes in a system, it provides an extra level of data security which may be a worthwhile tradeoff in at least some applications.

In some embodiments, once inaccessible backup data associated with a down deduplication node is obtained using the process described above, some version of the process shown in FIG. 2 is used to generate a consistent hash key for the obtained backup data and assign the obtained backup data to a new and functional deduplication node.

In some embodiments, a company (e.g., which uses a distributed deduplication backup system) may have specific handling requirements for some backup data where it may be desirable to bypass the assignment technique described herein. The following figure describes an example scenario in which backup data which is flagged is assigned to a node according to a policy.

Figure 11:
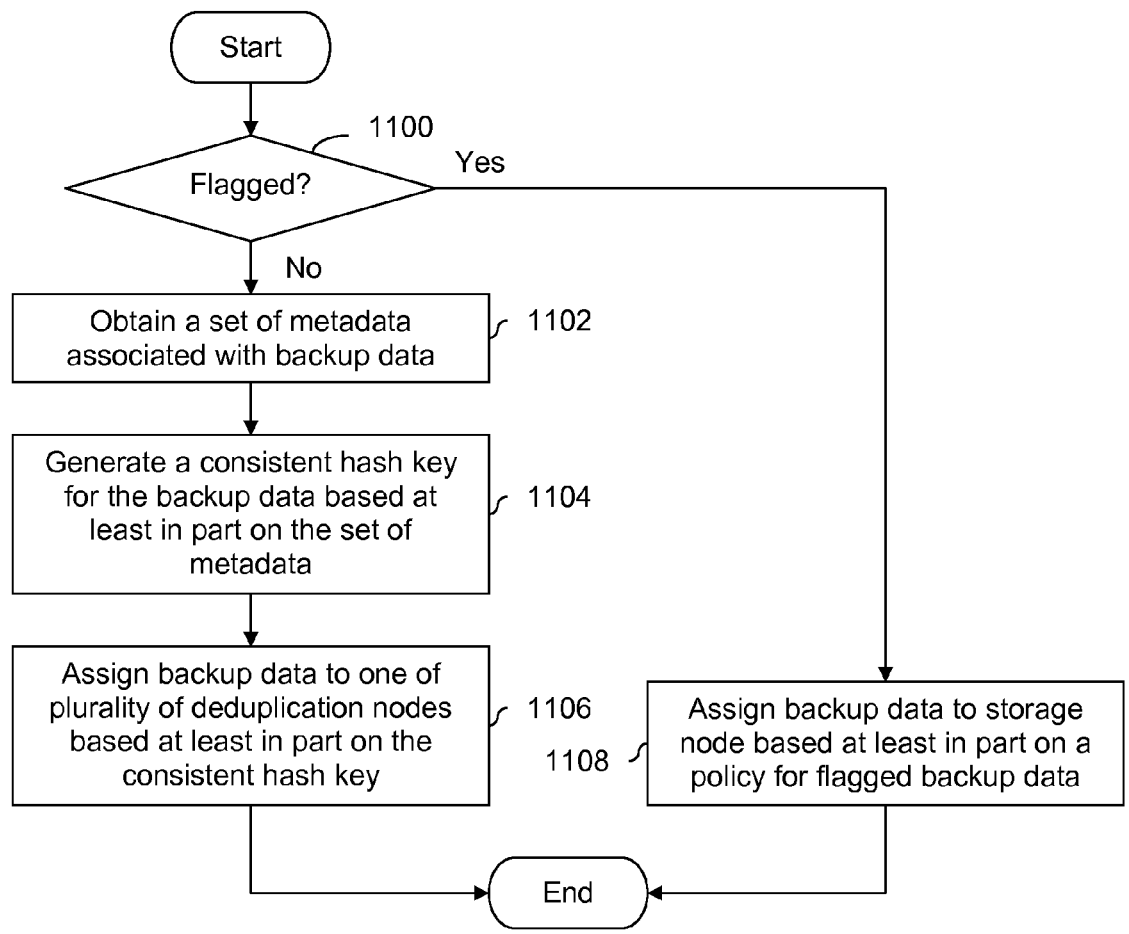
FIG. 11 is a flowchart illustrating an embodiment of a process for assigning flagged backup data to a node in a storage system.

FIG. 11 is a flowchart illustrating an embodiment of a process for assigning flagged backup data to a node in a storage system. In the example shown, the process is performed by a data router in a distributed deduplication backup system associated with a hospital.

At 1100, it is determined if the backup data being processed is flagged. For example, backup data from certain source organizations within the hospital (e.g., Medical Department and Billing Department) may be flagged whereas backup data from other source organizations (e.g., Facilities Department and Human Resources Department) is not flagged. In some embodiments, backup data is determined to be flagged at 1100 if certain metadata field(s) is/are certain values. For example, backup data may be determined to be flagged if it comes from certain source organizations (e.g., the backup data is determined to be flagged if it comes from the Medical Department or the Billing Department, but it is determined to be not flagged if it comes from the Facilities Department or the Human Resources Department).

If the backup data is not flagged at 1100, a set of metadata associated with backup data is obtained at 1102, a consistent hash key for the backup data is generated based at least in part on the set of metadata at 1104, and the backup data is assigned to one of a plurality of deduplication nodes based at least in part on the consistent hash key at 1106.

Otherwise, if the backup data is flagged at 1100, backup data is assigned to a storage node based at least in part on a policy for flagged backup data. In some embodiments, the policy is to assign the backup data to a storage node associated with a particular source organization. For example, backup data having a source organization of "Medical Department" is assigned to a storage node associated with that source organization and backup data having a source organization of "Billing Department" is assigned to a storage node associated with the billing department. Assigning flagged backup data to a storage node according to a policy may permit specific security, privacy, and/or retention requirements to be enforced at that node, ensuring that backup data is properly managed (e.g., protected, archived, etc.). One example is described in further detail below.

Figure 12:
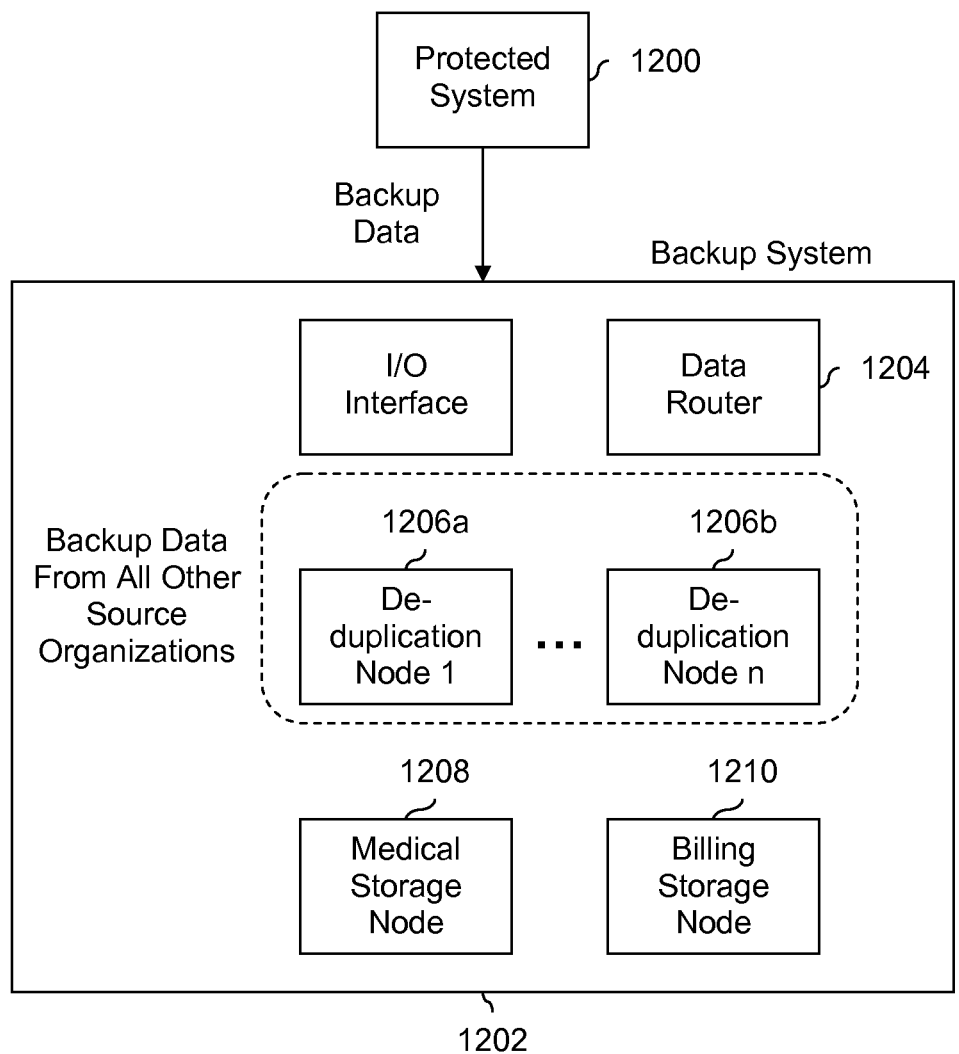
FIG. 12 is a diagram showing an embodiment of a distributed deduplication storage system with storage nodes for flagged backup data.

FIG. 12 is a diagram showing an embodiment of a distributed deduplication storage system with storage nodes for flagged backup data. In the example shown, protected system 1200 is associated with a hospital and backup system 1202 receives backup data from various source organizations within the hospital, for example, the Medical Department, the Billing Department, the Facilities Department, and the Human Resources Department.

Backup data associated with the Medical Department and the Billing Department are flagged in this example (or, alternatively, data router 1204 may determine from examining the metadata associated with the backup data that such backup data comes from the above source organizations). Backup data associated with the Medical Department and the Billing Department are sent, respectively, to medical storage node 1208 and billing storage node 1210. Storage nodes 1208 and 1210 may or may not perform deduplication.

In various embodiments, various management policies which are appropriate for the backup data assigned to that node may be enforced at storage nodes 1208 and 1210. For example, a hospital may be required by law to retain medical records for 10 years. To ensure this requirement is satisfied, a retention policy may be enforced at medical storage node 1208, which ensures that the backups of the medical records are kept for at least 10 years. In another example, patient billing information may have sensitive personal information (e.g., date of birth, social security number, etc.) and/or financial information (e.g., credit card number, bank account information, etc.) which needs to be protected. The backup data managed by billing storage node 1210 may be encrypted and/or access to backup data stored on billing storage node 1210 may be restricted to just a few people. These are just a few exemplary management policies that may be enforced at a storage node. In various embodiments, various management policies associated with (for example) encryption, retention, access, logging, or auditing may be enforced at a node.

In this example, backup data for all other source organizations (e.g., from the Facilities Department and the Human Resources Department) are assigned by data router 1204 to one of deduplication nodes 1206*a*-1206*b* using a consistent hash key.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing backup data, comprising:
obtaining corresponding sets of metadata associated with each of at least some of a plurality of backup data;
generating, using a processor, one or more consistent hash keys for each of at least some of the plurality of backup data based at least in part on the corresponding sets of metadata;
assigning the plurality of backup data to at least some of a plurality of deduplication nodes comprising a deduplication system based at least in part on the one or more consistent hash keys and on an interval associated with each of least some of the plurality of deduplication nodes;

detecting, based at least in part on a table, that a number of functioning deduplication nodes in the deduplication system has changed, wherein the table is configured to store a plurality of received deduplication node identifier information and received timestamp information;

determining, in response to detecting that the number of functioning deduplication nodes has changed, a new interval to assign to a first deduplication node and a new interval to assign to a second deduplication node; and redistributing at least some of the plurality of backup data based at least in part on the one or more consistent hash keys and on the new intervals assigned to each of the first deduplication node and the second deduplication node, including by performing one of the following: reassigning at least a portion of backup data from the first deduplication node and the second deduplication node to a third deduplication node, and reassigning at least a portion of backup data from the third deduplication node to the first deduplication node and the second deduplication node; and further comprising selecting the first deduplication node and the second deduplication node; and wherein:
in the event the third deduplication node comprises a new deduplication node that is added to the deduplication system, the first deduplication node and the second deduplication node are each selected based at least in part on a corresponding utilization value; and in the event the third deduplication node comprises an existing deduplication node that is removed from the deduplication system, the first deduplication node and the second deduplication node are selected based at least in part on a respective association with intervals that are adjacent to the interval associated with the third deduplication node.

2. The method of claim 1, wherein obtaining the corresponding sets of metadata includes analyzing the plurality of backup data and generating the corresponding sets of metadata based at least in part on the analysis.

3. The method of claim 2, wherein the analysis comprises one or more of the following: a run-time analysis, an algorithmic selection based at least in part on a policy requirement, a heuristic analysis, or an analysis based at least in part on an environmental condition extant at a time of backup.

4. The method of claim 1, wherein assigning a backup data to a deduplication node includes:
obtaining the intervals associated with each of at least some of the plurality of deduplication nodes; and
selecting, from the plurality of deduplication nodes, a deduplication node that is associated with an interval that includes the consistent hash key generated for the backup data.

5. The method of claim 1, wherein a backup data is assigned to a deduplication node based on a consistent hash key only in the event that the backup data is determined to not have been flagged.

6. The method of claim 5, wherein in the event that the backup data is determined to have been flagged, assigning the backup data to a deduplication node not based on the consistent hash key but based at least in part on a policy associated with flagged backup data.

7. The method of claim 6, wherein the policy associated with flagged backup data includes assigning flagged backup data to a storage node based at least in part on a source organization associated with flagged backup data.

8. The method of claim 1 further comprising receiving, from one of the plurality of deduplication nodes a message that includes a deduplication node identifier, a hash key, and routing information.

9. The method of claim 8, wherein the deduplication node identifier, the hash key, the routing information, and a corresponding timestamp are stored as an entry in the table.

10. The method of claim 9, wherein the timestamp is included in the message.

11. The method of claim 1 further comprising cleaning the table including by
determining whether to delete a first entry from the table based at least in part on a corresponding timestamp.

12. The method of claim 1, wherein the first deduplication node is determined to have the highest utilization value of the plurality of deduplication nodes in the deduplication system, wherein the second deduplication node is one of two deduplication nodes that are associated with intervals that are adjacent to the interval associated with the first deduplication node, and wherein the second deduplication node is determined to have a higher utilization value than the other adjacent deduplication node.

13. A system for processing backup data, comprising:
a processor configured to:
obtain corresponding sets of metadata associated with each of at least some of a plurality of backup data;
generate one or more consistent hash keys for each of at least some of the plurality of backup data based at least in part on the corresponding sets of metadata;
assign the plurality of backup data to at least some of a plurality of deduplication nodes comprising a deduplication system based at least in part on the one or more consistent hash keys and on an interval associated with each of least some of the plurality of deduplication nodes;
detect, based at least in part on a table, that a number of functioning deduplication nodes in the deduplication system has changed, wherein the table is configured to store a plurality of received deduplication node identifier information and received timestamp information;
determine, in response to detecting that the number of functioning deduplication nodes has changed, a new interval to assign to a first deduplication node and a new interval to assign to a second deduplication node; and
redistribute at least some of the plurality of backup data based at least in part on the one or more consistent hash keys and on the new intervals assigned to each of the first deduplication node and the second deduplication node, including by performing one of the following: reassigning at least a portion of backup data from the first deduplication node and the second deduplication node to a third deduplication node, and reassigning at least a portion of backup data from the third deduplication node to the first deduplication node and the second deduplication node; and a memory coupled with the processor and configured to provide the processor with instructions;

wherein:
the processor is further configured to select the first deduplication node and the second deduplication node;
in the event the third deduplication node comprises a new deduplication node that is added to the deduplication system, the first deduplication node and the second deduplication node are each selected based at least in part on a corresponding utilization value; and
in the event the third deduplication node comprises an existing deduplication node that is removed from the deduplication system, the first deduplication node and the second deduplication node are selected based at least in part on a respective association with intervals that are adjacent to the interval associated with the third deduplication node.

14. The system of claim 13, wherein obtaining the corresponding sets of metadata includes analyzing the plurality of backup data and generating the corresponding sets of metadata based at least in part on the analysis.

15. The system of claim 14, wherein the analysis comprises one or more of the following: a run-time analysis, an algorithmic selection based at least in part on a policy requirement, a heuristic analysis, or an analysis based at least in part on an environmental condition extant at a time of backup.

16. The system of claim 13, wherein assigning a backup data to a deduplication node includes:
obtaining the intervals associated with each of at least some of the plurality of deduplication nodes; and
selecting, from the plurality of deduplication nodes, a deduplication node that is associated with an interval that includes the consistent hash key generated for the backup data.

17. The system of claim 13, wherein the backup data is assigned to a deduplication node based on a consistent hash key only in the event that the backup data is determined to not have been flagged.

18. The system of claim 17, wherein in the event that the backup data is determined to have been flagged, assigning the backup data to a deduplication node not based on the consistent hash key but based at least in part on a policy associated with flagged backup data.

19. The system of claim 18, wherein the policy associated with flagged backup data includes assigning flagged backup data to a storage node based at least in part on a source organization associated with flagged backup data.

20. The system of claim 13, wherein the first deduplication node is determined to have the highest utilization value of the plurality of deduplication nodes in the deduplication system, wherein the second deduplication node is one of two deduplication nodes that are associated with intervals that are adjacent to the interval associated with the first deduplication node, and wherein the second deduplication node is determined to have a higher utilization value than the other adjacent deduplication node.

21. A computer program product for processing backup data, the computer program product being embodied in a non-transitory computer readable storage medium and comprising computer instructions for:
obtaining corresponding sets of metadata associated with each of at least some of a plurality of backup data;
generating one or more consistent hash keys for each of at least some of the plurality of backup data based at least in part on the corresponding sets of metadata;
assigning the plurality of backup data to at least some of a plurality of deduplication nodes comprising a deduplication system based at least in part on the one or more consistent hash keys and on an interval associated with each of least some of the plurality of deduplication nodes;
detecting, based at least in part on a table, that a number of functioning deduplication nodes in the deduplication system has changed, wherein the table is configured to store a plurality of received deduplication node identifier information and received timestamp information;
determining, in response to detecting that the number of functioning deduplication nodes has changed, a new interval to assign to a first deduplication node and a new interval to assign to a second deduplication node; and
redistributing at least some of the plurality of backup data based at least in part on the one or more consistent hash keys and on the new intervals assigned to each of the first deduplication node and the second deduplication node, including by performing one of the following: reassigning at least a portion of backup data from the first deduplication node and the second deduplication node to a third deduplication node, and reassigning at least a portion of backup data from the third deduplication node to the first deduplication node and the second deduplication node; and
further comprising computer instructions for selecting the first deduplication node and the second deduplication node; and
wherein:
in the event the third deduplication node comprises a new deduplication node that is added to the deduplication system, the first deduplication node and the second deduplication node are each selected based at least in part on a corresponding utilization value; and
in the event the third deduplication node comprises an existing deduplication node that is removed from the deduplication system, the first deduplication node and the second deduplication node are selected based at least in part on a respective association with intervals that are adjacent to the interval associated with the third deduplication node.

22. The computer program product of claim 21 further comprising computer instructions for receiving, from one of the plurality of deduplication nodes a message that includes a deduplication node identifier, a hash key, and routing information.

23. The computer program product of claim 22 wherein the deduplication node identifier, the hash key, the routing information, and a corresponding timestamp are stored as an entry in the table.

24. The computer program product of claim 23, wherein the timestamp is included in the message.

25. The computer program product of claim 21, further comprising computer instructions for cleaning the table, including by
determining whether to delete a first entry from the table based at least in part on a corresponding timestamp.

* * * * *